(12) United States Patent
Arweiler

(10) Patent No.: US 7,024,349 B2
(45) Date of Patent: Apr. 4, 2006

(54) METHOD AND DEVICE FOR ANALYZING DATA

(75) Inventor: Hans-Werner Arweiler, Berlin (DE)

(73) Assignee: Tektronix International Sales GmbH, (CH)

( * ) Notice: Subject to any disclaimer, the term of this patent is extended or adjusted under 35 U.S.C. 154(b) by 890 days.

(21) Appl. No.: 09/795,867

(22) Filed: Feb. 27, 2001

(65) Prior Publication Data
US 2001/0032069 A1 Oct. 18, 2001

(30) Foreign Application Priority Data
Apr. 14, 2000 (EP) ................................. 00108276

(51) Int. Cl.
*G06F 9/455* (2006.01)
*G06F 15/16* (2006.01)
(52) U.S. Cl. ........................................ 703/27; 709/249
(58) Field of Classification Search ................. 703/27; 709/249
See application file for complete search history.

(56) References Cited

U.S. PATENT DOCUMENTS

| | | |
|---|---|---|
| 3,826,908 A | 7/1974 | Weathers et al. |
| 4,125,763 A | 11/1978 | Drabing et al. |
| 4,483,002 A | 11/1984 | Groom, Jr. et al. |
| 5,287,506 A | 2/1994 | Whiteside |
| 5,347,524 A | 9/1994 | I'Anson et al. |
| 5,528,748 A | 6/1996 | Wallace |
| 5,579,476 A | 11/1996 | Cheng et al. |
| 5,737,521 A | 4/1998 | Kleber et al. |
| 5,745,777 A | 4/1998 | English et al. |
| 5,774,695 A * | 6/1998 | Autrey et al. .................. 703/26 |
| 5,850,388 A * | 12/1998 | Anderson et al. ........... 370/252 |
| 5,870,399 A | 2/1999 | Smith |
| 6,618,393 B1* | 9/2003 | Chiles et al. ................ 370/466 |

OTHER PUBLICATIONS

Dr. L. Absillis, Prof. M. Goossens, "Advanced Protocol Analysers", Proceedings of the IFIP TC6 International Conference on Information Networks and Data Communication, NL, Amsterdam, North Holland, Apr. 1994.

* cited by examiner

*Primary Examiner*—Paul L. Rodriguez
*Assistant Examiner*—Dwin M. Craig
(74) *Attorney, Agent, or Firm*—Francis I. Gray

(57) ABSTRACT

A method and device for analyzing data, the sequence of which is describable by a state machine, has a configurable filter into which the data is input, an emulation of a part of the state machine implemented as a loadable hardware circuit in which states and conditions related to a current state are loaded, and means for determining a new current state from the states in the emulation resulting from applying the conditions to the filtered data. The configurable filter is reconfigured and the loadable hardware circuit is reloaded based upon the new current state being the current state. The process is continued until the data is processed according to the state machine.

9 Claims, 2 Drawing Sheets

METHOD AND DEVICE FOR ANALYZING DATA

BACKGROUND OF THE INVENTION

The present invention relates to a method and device for analyzing data, the sequence of which is described by a state machine.

In a network digital data are usually transmitted according to specified rules. One shape such rules may take are so-called protocols. Protocols may be described in the form of SDL diagrams or as state machines. Accordingly a participant in data transfer is always in a certain state of the state machine, proceeding from which he may, if a certain condition is satisfied or if certain conditions are satisfied, change into another state. FIG. 1 shows a simple example of a state machine. It is assumed that the telecommunication participant under consideration is initially in state A. From this state he, if condition a is satisfied, changes into state C. If condition b is satisfied, he changes into state B. Proceeding from state C, depending upon whether condition c or d is satisfied, he changes to state E or state D respectively.

For the analysis of networks for transmission errors, faults or the like, so-called protocol testers are often used. A protocol tester is designed to analyze the data transmitted. According to one technique the analysis takes place during offline operation, i.e., the data transmitted is first loaded into storage and subsequently filtered out by means of software search routines. Depending upon the data found, further data fragments may be selected in steps from the total quantity of the data and analyzed. The disadvantage of this procedure is that it does not enable analysis in real time. From a disproportionately large quantity of data stored, the relevant data have to be sorted out in a very time-consuming manner.

Another procedure is shown in U.S. Pat. No. 5,850,388 issued Dec. 15, 1998 to Craig D. Anderson et al entitled "Protocol Analyzer for Monitoring Digital Transmission Networks". In order to analyze data in real time, the protocol tester is equipped with several Reduced Instruction Set Computer (RISC) processors and also features hardware filters to filter bit sequences that are previously specified by a user from the incoming data. The disadvantage of this protocol tester is that it involves an enormous amount of hardware which not only impacts on costs, but also on weight and the handiness of the equipment.

What is desired is a method and device for analyzing data which enables analysis in real time, but requires a much reduced amount of hardware.

BRIEF SUMMARY OF THE INVENTION

Accordingly the present invention provides a method and device for analyzing data. the sequence of which is describable by a state machine, which has a configurable filter into which the data is input, an emulation of a part of the state machine imDlemented as a loadable hardware circuit in which states and conditions related to a current state are loaded, and means for determining a new current state from the states in the emulation resulting from aoolying the conditions to the filtered data. The configurable filter is reconfigured and the loadable hardware circuit is reloaded based upon the new current state being the current state. The process is continued until the data is processed according to the state machine.

The objects, advantages and other novel features of the present invention are apparent from the following detailed description when read in conjunction with the appended claims and attached drawing.

DETAILED DESCRIPTION OF THE INVENTION

Figure 1:
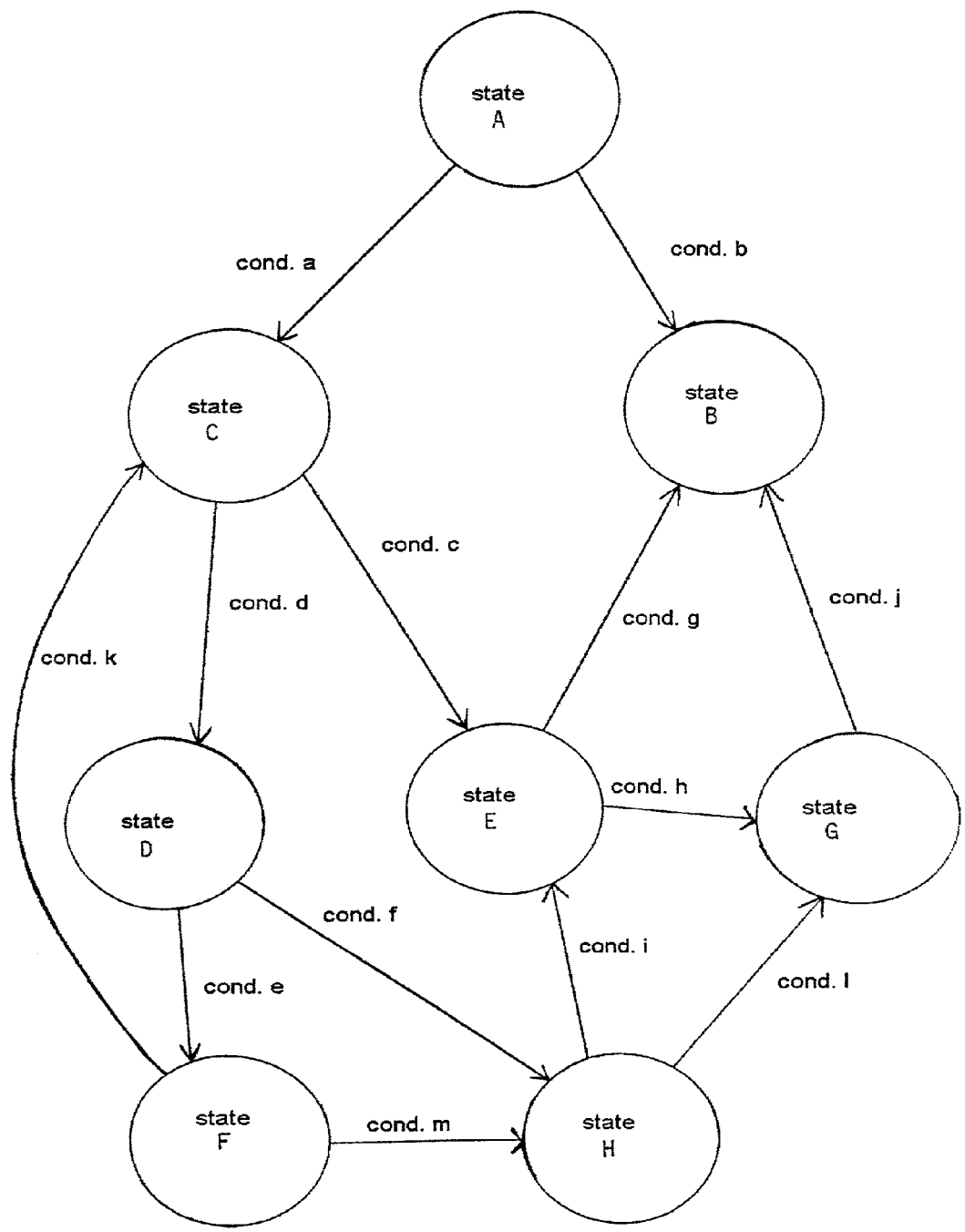
FIG. 1 is a schematic representation for a simple example of a state machine.

FIG. 1 shows the configuration of a protocol on the basis of a state machine. In this simple example the circles represent states, while the arrows between circles correspond to one or several conditions that have to be satisfied in order to change from the state at the starting point of the arrow to the state at the tip of the arrow. In the hardware implementation shown in U.S. Pat. No. 5,850,388 the entire state machine is realized in hardware. The current solution follows another path. Proceeding from state A at time t1, only conditions a and b as well as states B and C are loaded into the hardware emulation of the state machine. In the event that condition a occurs at time t2, there is a change from state A to state C. In state C the emulations of conditions c and d and of states D and E are loaded into the hardware emulation. If the memory area is insufficient, the system writes over the emulation of conditions a and b and states A and B. In the event that condition d occurs at time t4, there is a change from state C to state D. The consequence of this is that emulations of conditions e and f and of states F and H are loaded into the emulation circuit. If the memory area is insufficient, the system writes over conditions and states not initially required in respect of the current state.

Figure 2:
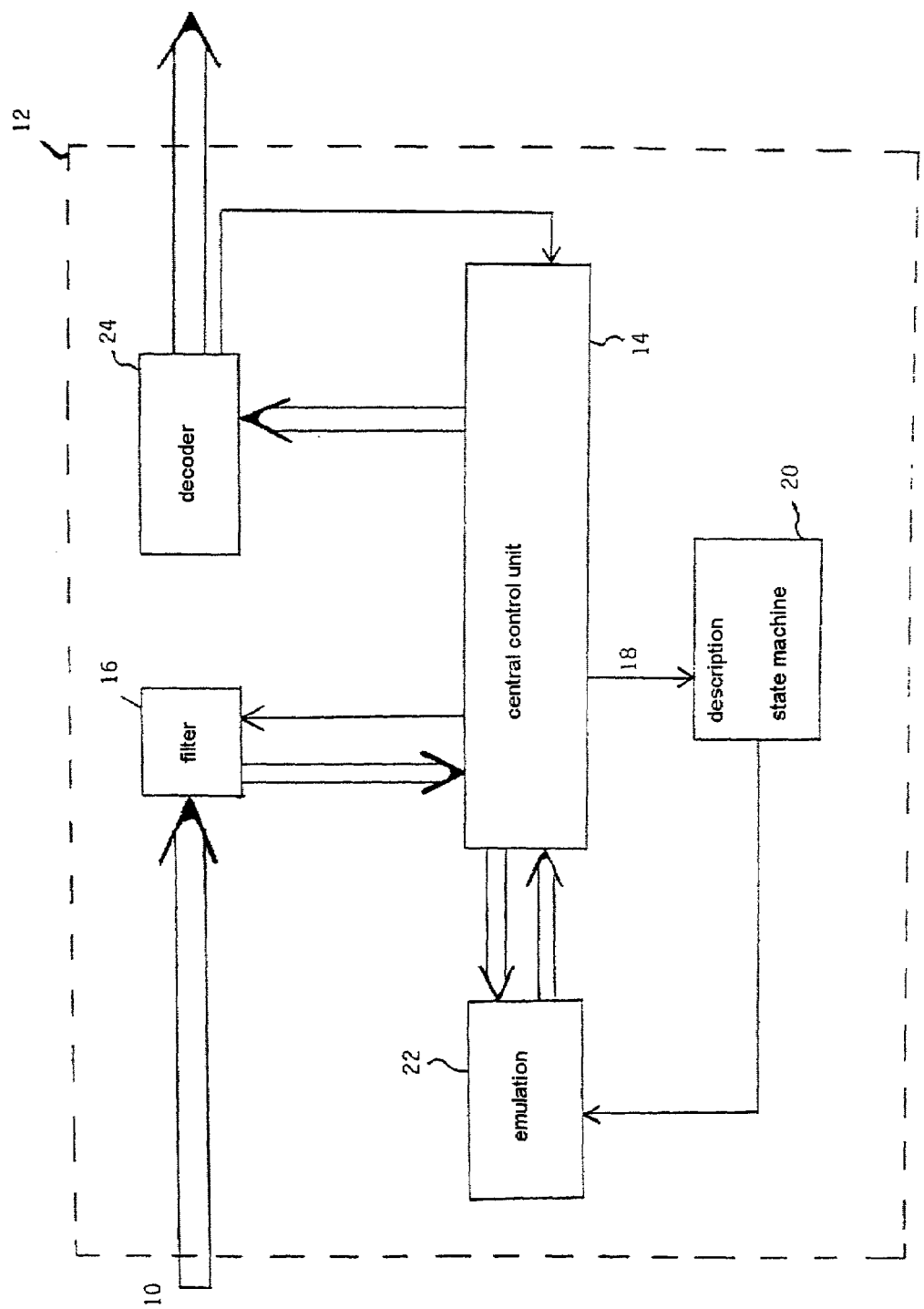
FIG. 2 is a block diagram for a method and device for analyzing data according to the present invention.

Referring now to FIG. 2 the configuration of an analyzing device 12 is shown. The double arrows mark the flow of data, while the single arrows mark information that is determined from the data. Not shown is a device for creating a synchronization between the incoming data 10 to the analyzing device 12 and a device for determining the current state of the state machine. These devices are sufficiently well known to the person of ordinary skill in the art and are, therefore, not described here in further detail. The current state determined is reported to a central control unit 14. For the current state the central control unit 14 configures a filter 16. The filter 16 is in particular configured for the search of data that corresponds to the conditions that are possible on the basis of the current determined state. Moreover the central control unit 14 applies a signal 18 to an element 20 in which a software description of the state machine used is stored. The signal 18 corresponds with the current state of the state machine and initiates an update of a loadable or emulation hardware circuit 22. The emulation 22 only represents a portion of the state machine which is relevant to the current state of the state machine, i.e. when proceeding from the current state the possible subsequent conditions and states are loaded.

After initialization the incoming data 10 are filtered according to the configuration of the filter 16 and transferred to the central control unit 14. The central control unit 14 transfers the filtered data to the emulation 22 of the relevant portion of the state machine. The filtered data as modified by the emulation 22 are transferred back to the central control unit 14. These data are transferred to a decoder 24 to produce decoded data 26 available at the output of the analyzing device 12. Also the decoded data are supplied to the central control unit 14 which uses these data to determine a new current state of the state machine. Depending on the new current state the filter 16 is reconfigured and the emulation 22 is updated via the element 20. The components of the analyzing device 12 are selected so that the analysis producing the output data 26 may occur in real time.

In case the protocol is configured in accordance with the OSI reference model, the analyzing device 12 is particularly designed for analyzing the protocol layer that is located between a data link layer and a presentation layer in a protocol stack. The entire analyzing device 12 may be implemented on an integrated circuit, and the protocol tester containing the analyzing device may be implemented as a hand-held instrument.

Thus the present invention provides a method and device for analyzing data based on a state machine by emulating a portion of the state machine relating to the current state and connecting conditions and states, the incoming data being filtered according to a configuration determined by the current state and the emulation and filter configuration being changed as conditions are met and states change.

What is claimed is:

1. A method of analyzing data, the sequence of which is describable by a state machine, comprising the steps of:
    configuring a filter of an analyzing device for processing the data as a function of a current state of the state machine;
    processing the filtered data by an emulation of a part of the state machine which is relevant to the current state, the emulation being a loadable hardware circuit representing states and conditions emanating from the current state, to determine a new current state;
    updating the emulation by loading at least one further state and/or one further condition into the loadable hardware circuit as a function of the new current state, the new current state becoming the current state; and
    repeating the configuring, processing and updating steps until the processing of the data is complete.

2. The method as recited in claim 1 wherein the filter in the configuring step is configured to search for data corresponding to the conditions that exist in the emulation.

3. The method as recited in claim 1 wherein the state machine comprises a state machine corresponding to a data transfer protocol.

4. The method as recited in claim 3 wherein the data transfer protocol is configured in accordance with an OSI reference model with a protocol layer located between a data link layer and a presentation layer being analyzed by the analyzing device.

5. A device for analyzing data, the sequence of which is described by a state machine, comprising:
    a configurable filter for receiving the data, the configurable filter being configured as a function of a current state of the state machine;
    a loadable hardware circuit coupled to receive filtered data from the configurable filter for emulating states and conditions of a relevant part of the state machine related to the current state;
    means for determining a new current state of the state machine from among the states in the loadable hardware circuit as a function of the conditions and the filtered data; and
    means for updating the loadable hardware circuit by loading a further state and/or condition into the loadable hardware circuit as a function of the new current state, the new current state becoming the current state.

6. The device as recited in claim 5 wherein the configurable filter is configured to search for data that correspond to the conditions in the loadable hardware circuit as the filtered data.

7. The device as recited in claim 6 wherein the state machine corresponds to a data transfer protocol.

8. The device as recited in claim 7 wherein the data transfer protocol is configured in accordance with an OSI reference model with a protocol layer located between a data link layer and a presentation layer being analyzed by the analyzing device.

9. A method of analyzing data based on a state machine comprising the steps of:
    emulating a portion of the state machine relating to a current state and connecting conditions and states in a programmable hardware circuit;
    filtering the data according to a configuration determined by the current state for input to the emulating step;
    changing the portion of the state machine for the emulating step and the configuration for the filtering step as the current step transitions to one of the connecting states as a function of the connecting conditions applied in the emulating step to the data from the filtering step, the one connecting state becoming the current state; and
    repeating the emulating, filtering and changing steps until the data has been analyzed by the state machine.

* * * * *